United States Patent [19]
Ruholl

[11] Patent Number: 5,951,195
[45] Date of Patent: Sep. 14, 1999

[54] METHOD FOR PRODUCING A BALL PIVOT ARRANGEMENT AND BALL PIVOT ARRANGEMENT FOR A BALL JOINT

[75] Inventor: Herbert Ruholl, Braunschweig, Germany

[73] Assignee: Volkswagen AG, Wolfsburg, Germany

[21] Appl. No.: 09/135,442

[22] Filed: Aug. 17, 1998

[30] Foreign Application Priority Data

Aug. 16, 1997 [DE] Germany .......................... 197 35 638

[51] Int. Cl.⁶ ........................................... B25G 3/34
[52] U.S. Cl. ..................... 403/270; 403/128; 403/122; 29/898.053
[58] Field of Search ................... 403/270, 271, 403/128, 131, 122; 29/898.052, 898.053; 228/114, 114.5, 135, 208

[56] References Cited

U.S. PATENT DOCUMENTS

| | | | |
|---|---|---|---|
| 2,678,841 | 5/1954 | Klages | 403/270 |
| 3,121,948 | 2/1964 | Hollander et al. | 228/114 |
| 3,831,245 | 8/1974 | Amos | 29/898.053 |
| 3,952,390 | 4/1976 | Amos | 29/898.053 |
| 3,965,554 | 6/1976 | Amos | 29/898.053 |
| 4,223,825 | 9/1980 | Williams | 228/114 |
| 5,065,934 | 11/1991 | Ito | 228/114.5 |
| 5,314,106 | 5/1994 | Ambroziak et al. | 228/114 |

FOREIGN PATENT DOCUMENTS 3739463  6/1989  Germany .

OTHER PUBLICATIONS

"Reibschweisspraxis" "Friction Welding Application" "Utilisation du soudage par friction"; IWKA–Schweisstechnik; IWKA–Welding Technique; IWKA–Technique du soudage.

*Primary Examiner*—Lynne Reichard
*Assistant Examiner*—David Bochna
*Attorney, Agent, or Firm*—Baker & Botts, L.L.P.

[57] ABSTRACT

In the ball pivot arrangement for a ball joint described in the specification, an essentially spherical upper region and an essentially bar-shaped lower region are joined by friction welding, the spherical region being capable of being mounted in a joint cup or joint socket to form a ball joint and the bar-shaped region constituting a joint rod. The costs involved in producing the ball pivot arrangement are reduced and the ball pivot arrangement is more effectively adaptable to different stresses because each of the components can be machined or hardened separately to provide required dimensions or hardness before assembly.

12 Claims, 1 Drawing Sheet

METHOD FOR PRODUCING A BALL PIVOT ARRANGEMENT AND BALL PIVOT ARRANGEMENT FOR A BALL JOINT

BACKGROUND OF THE INVENTION

This invention relates to methods for producing a ball pivot arrangement for a ball joint in which the ball pivot arrangement has an essentially spherical upper region and an essentially bar-shaped lower region and to a corresponding ball pivot arrangement in which the spherical region is capable of being mounted in a joint cup or a joint socket to form a ball joint and the bar-shaped region constitutes a joint rod.

Conventional integrally produced ball pivot arrangements are generally cast, forged or rolled according to their shape. The blanks produced in this way have an essentially spherical upper region and an essentially bar-shaped lower region. In order to permit the ball pivot blank to be used appropriately in a ball joint, it has to be remachined after casting. Preferably, the ball pivot produced as a blank is lathe-turned, ground and/or hardened appropriately for the desired use. It is also possible for ball pivots of this type to be forged.

The conventional method for producing ball pivot arrangements which is ultimately used in a ball joint is not designed in the best possible way. On the one hand, the method is complicated and costly, since the ball pivot is first cast and the resulting blank then has to be remachined appropriately at a high expense. Remachining is made even more labor intensive by the non-uniform shape of the ball pivot structure. Furthermore, a disadvantage of the conventional ball pivot arrangement is that the spherical region and the bar-shaped region consist essentially of the same material or of the same alloy. Since the spherical region is generally capable of being mounted in a joint cup or joint socket of a ball joint and the bar-shaped region is generally designed as a joint rod, different forces with different stresses are applied to these differently shaped regions. In order to withstand these different stresses, for example, the spherical region has to be hardened in a different way from the bar-shaped region. This in turn makes the operation even more labor intensive. Also, a disadvantage of the conventional ball pivots is that it is not possible, for example, to produce the spherical region from a highly wear-resistant steel while using a less wear-resistant and possibly less expensive steel for the bar-shaped region. The production of conventional ball pivot arrangements thus becomes increasingly costly and complicated with increasing differences between the spherical region and the bar-shaped region as required for their respective uses.

SUMMARY OF THE INVENTION

Accordingly, it is an object of the present invention to provide a ball pivot arrangement for a ball joint and a method for producing it which overcomes disadvantages of the prior art.

Another object of the invention is to provide an improved method for producing a ball pivot arrangement and an improved ball pivot arrangement, in which the outlay and costs of producing the ball pivot arrangement are reduced and the ball pivot arrangement is better adapted to applied stresses.

These and other objects of the invention are attained by joining an essentially spherical element to an essentially bar-shaped element by a friction-welding process to form a ball pivot arrangement. The ball pivot arrangement includes a spherical region with a first contact face and the bar-shaped region has a second contact face and these contact faces are friction-welded to each other.

According to the invention, each of the spherical region and the bar-shaped region is at least partially prefabricated individually and they are then assembled by a friction-welding process to form a ball pivot arrangement consisting of the essentially spherical element and the essentially bar-shaped element. For this purpose, the spherical element has a first contact face and the bar-shaped element has a second contact face and these contact faces are friction-welded to each other. The advantage of this is that the production method is simplified and therefore is less expensive. On the one hand, the labor involved in remachining of the individual regions is reduced, particularly because the individual spherical and bar-shaped elements can be machined more simply before they are assembled. Furthermore, different materials or alloys can be used for the spherical region and the bar-shaped region so that each of these regions is appropriately adapted to the particular stresses applied to it by selecting a suitable material or a suitable alloy. Ball pivot arrangements can consequently be produced for specific application in a substantially less complicated way and are better adapted to the applied stresses. As a result, appropriate modifications of the method according to the invention and of the ball pivot arrangement according to the invention are possible.

BRIEF DESCRIPTION OF THE DRAWING

Further objects and advantages of the invention will be apparent from a reading of the following description in conjunction with the single drawing of FIG. 1 which is a diagrammatic sectional side view illustrating a ball pivot arrangement according to the invention which is produced by the method of the invention.

DESCRIPTION OF THE PREFERRED EMBODIMENTS

Figure 1:
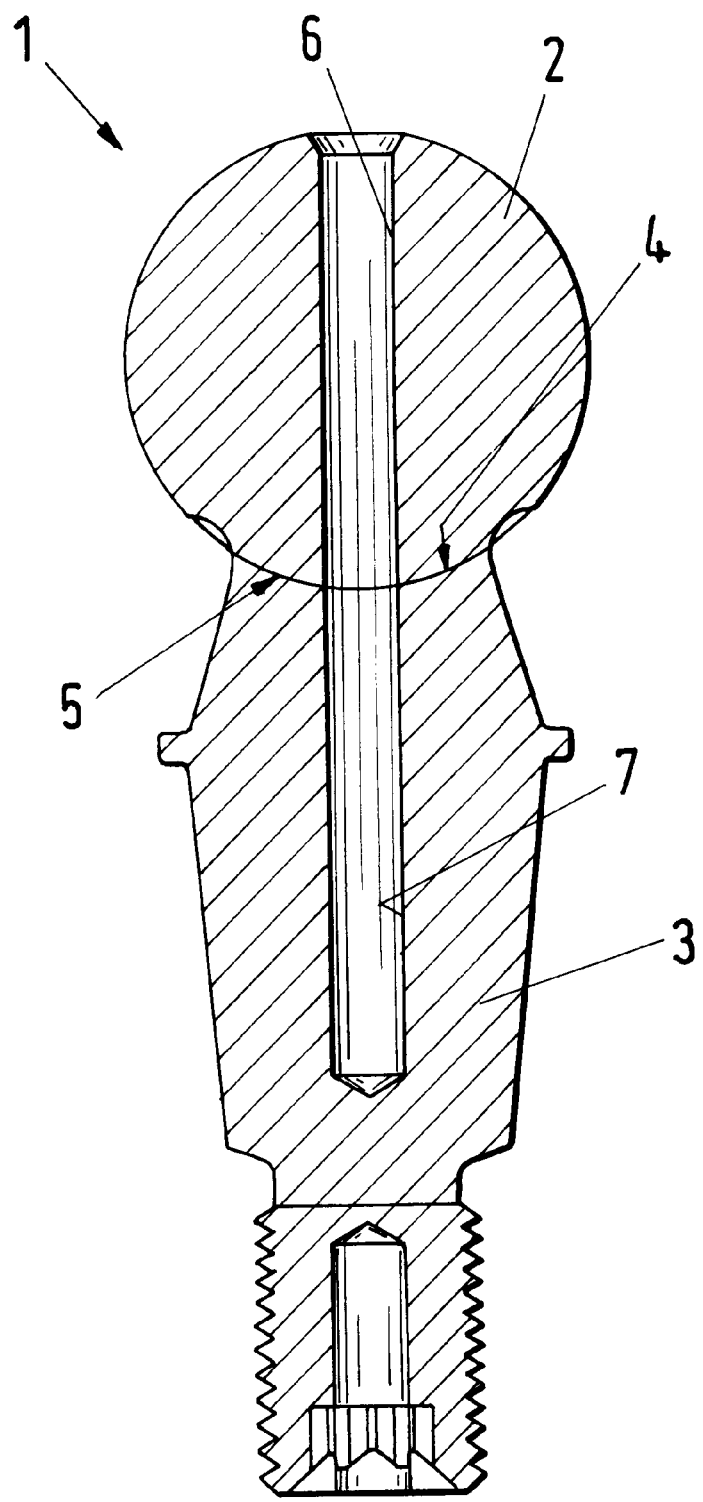

In the typical embodiment of the invention shown in FIG. 1, a ball pivot arrangement 1 for use in a ball joint, not illustrated, has an essentially spherical upper region 2 and an essentially bar-shaped lower region 3. The method for producing this ball pivot arrangement 1 is not illustrated explicitly, but only the resulting ball pivot arrangement 1 itself is shown.

The spherical region 2 is capable of being mounted in a joint cup or joint socket (not illustrated) in order to form a ball joint. The bar-shaped region 3 constitutes a joint rod.

The disadvantages of the prior art described above are avoided in the method according to the invention by joining an essentially spherical element corresponding to the spherical region 2 of FIG. 1 to an essentially bar-shaped element corresponding to the bar-shaped region 3 by a friction-welding process to form the resulting ball pivot arrangement 1. For this purpose, the spherical region 2 has a first contact face 4 and the bar-shaped region 3 a second contact face 5 and these contact faces 4 and 5 are connected to each other by friction-welding. The resulting welded joint is illustrated diagrammatically in FIG. 1 as a thick black line.

In the method of the invention, the spherical element 2 is designed as a semi-finished product. It is also possible for the bar-shaped element 3 to be designed as a semi-finished product. Since semi-finished products are generally very cheap to produce, the method of the invention is substantially more cost-effective if the corresponding semi-finished products are assembled together than the methods known hitherto in the prior art. Since the ball pivot 1 does not have to be produced entirely from the same material or from the same alloy, but, for example, can be made by joining two semi-finished products to each other, the differently shaped spherical and bar-shaped regions 2 and 3 can each be designed so as to correspond better to the stresses applied during use. This not only increases the lifetime of the ball pivot 1, but also increases its flexibility in terms of its technical use in the respective area of application.

In order that the friction-welding process can be carried out in the best possible way, the spherical element and bar-shaped element have corresponding contact faces. As shown in FIG. 1, the spherical region 2 has a convex first contact face 4 and the bar-shaped region 3 has a corresponding concave second contact face 5. In the friction-welding process, relative motion is generated between the contact faces by rotating one or both of the spherical and bar-shaped elements. During this motion, the spherical element and the bar-shaped element are pressed against each other at their contact faces, and are then pressed together with a greater upsetting pressure after the frictional motion has stopped. By appropriately selecting the friction time, it is possible to assure that carbon diffusion in the region of the friction-welded joint is minimized or maximized as desired depending on the particular alloys used. The upsetting pressure may also be selected depending on the different types of steel used, so that the quantity of carbonized molten material pressed out during the friction-welding process is appropriately controlled so as to avoid or promote a graphite or lamellar structure in particular as desired.

If specific appropriate semi-finished components are used to produce the ball pivot arrangement 1, the semi-finished components can be machined before assembly so as to achieve specific dimensioning and/or a specific degree of hardness, for example. Depending on the steps required, the method can be carried out with a low labor involvement. The resulting ball pivot arrangment 1 can thus be designed appropriately for required applications.

In the typical ball pivot arrangement 1 illustrated in the drawing, the bar-shaped region 3 constitutes a joint rod. As shown in the drawing, the spherical and bar-shaped regions 2 and 3 have centering bores 6 and 7, respectively. By using the centering bores 6 and 7, it is possible for the contact faces 4 and 5 to be positioned relative to each other during the friction welding. For this purpose a corresponding pin, for example, can be inserted into the centering bores 6 and 7 during welding and removed after welding is completed.

In another embodiment a material promoting friction welding and the connecting process is applied to at least one of the contact faces shortly before the connection of the faces 4 and 5 of the spherical region 2 and the bar-shaped region 3. This step may depend on the different materials or on the different alloys used.

Preferably, the spherical region 3 or the spherical element is appropriately case-hardened, preferably before being connected to the bar-shaped element. The required degree of hardness depends, in turn, on the particular stresses which are applied during use of the structure. By using the illustrated ball pivot arrangement 1, it is possible to form a ball joint which is suitable, for example, for receiving a wheel mount for a motor vehicle. In this application particularly, the method described herein and the ball pivot arrangement 1 described herein are especially advantageous. This is because, depending on the stresses which occur differently in different motor vehicle types, a ball pivot arrangement 1 having different characteristics can be produced particularly easily by using different semi-finished products having different dimensioning or different degrees of hardness, thus making the method and the ball pivot arrangement 1 itself highly cost-effective.

Although the invention has been described herein with reference to specific embodiments, many modifications and variations therein will readily occur to those skilled in the art. Accordingly, all such variations and modifications are included within the intended scope of the invention.

I claim:

1. A method for producing a ball pivot arrangement for a ball joint having an essentially spherical region and an essentially bar-shaped region comprising friction-welding an essentially spherical element to an essentially bar-shaped element to form a ball pivot arrangement wherein each of the essentially spherical element and the essentially bar-shaped element have a centering bore and including the step of introducing a pin into the centering bores to position contact faces of the elements relative to each other during friction welding.

2. A method according to claim 1 wherein the essentially spherical element is a semi-finished component.

3. A method according to claim 1 wherein the essentially bar-shaped element is a semi-finished component.

4. A method according to claim 1 wherein the essentially spherical element and the essentially bar-shaped element have mating contact faces.

5. A method according to claim 4 wherein the essentially spherical element has a convex contact face and the essentially bar-shaped element has a concave contact face.

6. A method according to claim 1 wherein each of the essentially spherical element and the essentially bar-shaped element is a semi-finished component with specific dimensioning and/or a specific degree of hardness.

7. A method according to claim 1 wherein the essentially bar-shaped element constitutes a joint rod.

8. A method according to claim 1 including the step of applying a material promoting friction welding and connection of the elements to at least one of the contact faces of the elements before the essentially spherical element and the essentially bar-shaped element are connected.

9. A ball pivot arrangement for a ball joint comprising an essentially spherical region capable of being mounted in a joint cup or joint socket to form a ball joint and an essentially bar-shaped region constituting a joint rod wherein the essentially spherical region has a first contact face and the essentially bar-shaped region a second contact face and the contact faces are friction-welded to each other and wherein the essentially spherical region and the essentially bar-shaped region each have a centering bore aligned with each other.

10. A ball pivot arrangement according to claim 9 wherein the first contact face has a convex shape and the second contact face has a concave shape.

11. A ball pivot arrangement according to claim 9 wherein the essentially spherical region is case-hardened.

12. A ball pivot arrangement according to claim 9 including means on the ball pivot arrangement for receiving a wheel support for a motor vehicle.

\* \* \* \* \*